(12) United States Patent
Lee

(10) Patent No.: US 11,938,712 B1
(45) Date of Patent: Mar. 26, 2024

(54) MACHINE WASHABLE AND DRYABLE YOGA MAT

(71) Applicant: Donna Marie Lee, Harvard, MA (US)

(72) Inventor: Donna Marie Lee, Harvard, MA (US)

( * ) Notice: Subject to any disclaimer, the term of this patent is extended or adjusted under 35 U.S.C. 154(b) by 68 days.

(21) Appl. No.: 17/464,965

(22) Filed: Sep. 2, 2021

Related U.S. Application Data

(60) Provisional application No. 63/073,610, filed on Sep. 2, 2020.

(51) Int. Cl.
*B32B 5/06* (2006.01)
*A63B 21/00* (2006.01)
*B32B 5/00* (2006.01)
*B32B 5/18* (2006.01)
*B32B 5/24* (2006.01)

(52) U.S. Cl.
CPC .......... *B32B 5/073* (2021.05); *A63B 21/4037* (2015.10); *B32B 5/00* (2013.01); *B32B 5/18* (2013.01); *B32B 5/245* (2013.01)

(58) Field of Classification Search
CPC ................ A63B 21/4037; B32B 5/073; B32B 2038/008; B32B 7/09; B32B 37/04; B32B 37/06–065; B29C 65/62; A47G 9/06–068; A47G 27/02–0293
See application file for complete search history.

(56) References Cited

U.S. PATENT DOCUMENTS

| | | | |
|---|---|---|---|
| 6,645,597 B1* | 11/2003 | Swain | B60N 3/048 428/68 |
| 8,631,833 B2 | 1/2014 | Garbarino | |
| 9,463,348 B2 | 10/2016 | Connaughton et al. | |
| 2002/0132086 A1* | 9/2002 | Su-Tuan | B32B 37/24 442/101 |
| 2004/0250346 A1 | 12/2004 | Vasishth | |
| 2005/0239604 A1* | 10/2005 | Denham | A63B 21/4037 482/148 |
| 2010/0247841 A1* | 9/2010 | Bell | A47G 27/0225 428/89 |
| 2012/0208416 A1* | 8/2012 | Lerman | A47G 27/0225 442/1 |

FOREIGN PATENT DOCUMENTS

| | | | | |
|---|---|---|---|---|
| GB | 441239 A | * | 1/1936 | ......... A47G 27/0281 |
| GB | 2362823 A | * | 12/2001 | ......... A47G 27/0287 |
| KR | 100686627 | * | 2/2007 | ......... A63B 21/4037 |

* cited by examiner

*Primary Examiner* — Frank J Vineis
*Assistant Examiner* — Nicole T Gugliotta
(74) *Attorney, Agent, or Firm* — Thomas P. O'Connell; O'Connell Law Firm

(57) ABSTRACT

A machine washable and dryable yoga mat with an upper layer comprising a towel material, a central layer comprising a layer of fusible foam material fused to the upper layer, and a lower layer comprising a polymer-coated fabric. The upper, central, and lower layers are stitched together to form a rectangular yoga mat body. The upper layer has a width greater than the widths of the central and lower layers such that border strips of the upper layer can be wrapped around the lateral edges of the central and lower layers and fastened. The layers are joined by side stitching that traverses longitudinally adjacent to the lateral edges of the yoga mat body, by end stitching that traverses laterally across the yoga mat body adjacent to the first and second ends thereof, and by a plurality of spaced lines of lateral stitching that traverse laterally across the yoga mat body.

17 Claims, 12 Drawing Sheets

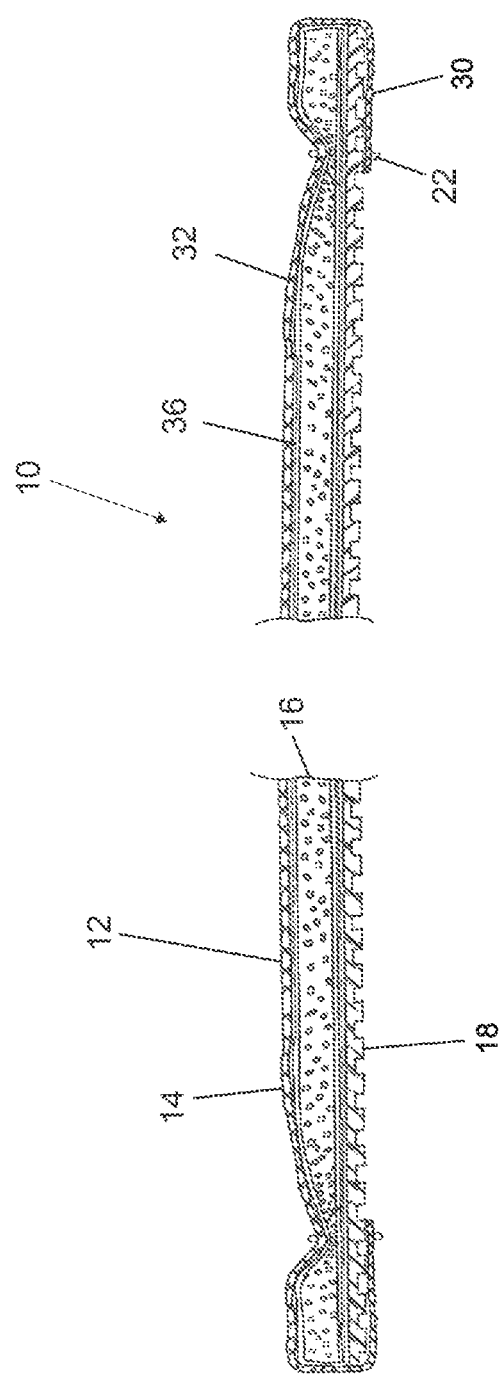

MACHINE WASHABLE AND DRYABLE YOGA MAT

RELATED APPLICATION

This application claims priority to Provisional Application No. 63/073,610, filed Sep. 02, 2020, the entirety of which being incorporated herein by reference.

FIELD OF THE INVENTION

The present invention relates generally to exercise mats. More particularly, disclosed herein is a portable yoga mat that exhibits traction, stability, and cushioning during challenging yogic poses and that can be washed and dried by machine thereby to be cleansed of unsanitary viral, fungal, and bacterial sources and freed of unpleasant odor, dirt, and contamination.

BACKGROUND OF THE INVENTION

The practice of yoga has ancient origins. Through physical, mental, and spiritual discipline, yoga seeks to unite body, mind, breath, and spirit. In modern days, yoga has become a popular technique for developing and maintaining physical and spiritual health and fitness. Yoga provides flexibility and strength, improves balance, develops and tones the muscles, and promotes overall health and well-being.

Individual yogic exercises are often done in steady poses called Asanas. Some of the many Asanas include Bridge, Dolphin, Upward-facing dog, Downward-facing dog, Warrior I, II, and III, Scorpion, and Plank. Each requires physical and mental discipline and dexterity in achieving and maintaining the desired pose. Moreover, the foregoing and many other yogic poses require not only a stable support surface but also satisfactory grip and traction between the practitioner and the support surface.

Meditational yoga was originally practiced on deer and tiger skin rugs or even directly on hard earth. However, modern yoga is normally performed on individual mats that are designed to provide a degree of cushioning to the human body and to facilitate traction for the practitioner's hands, feet, and other body parts during challenging yoga poses.

Yoga mats according to the prior art are often formed of one or more layers of resiliently compressible material, such as solid or foam rubber. The mats have an outer surface designed to provide the grip and traction between the user and the mat required to perform and maintain challenging yogic poses. Yoga mats, which are typically rectangular, can be rolled and unrolled for repeated use. Many experienced yoga practitioners have their own mats for home use and for transporting to and from yoga studios. Others may make use of a mat provided by the yoga studio such that the same mat is used by many different people.

Being a physically demanding exercise by nature, yoga causes many of those practicing it to sweat. This is particularly true of what is referred to as hot yoga where yoga is performed in a very warm and humid studio. A prior art yoga mat whose surface has become coated with sweat can become slick thereby causing a loss in the grip and traction that are at the very essence of the mat's purpose. Moreover, using and reusing a yoga mat that has been saturated with sweat and rolled and stored, particularly one used by multiple different persons, is unpleasant and unsanitary.

According to Dr. Robert Lahita as quoted in "Could Your Dirty Yoga Mat Be Making You Sick?" by Melissa Locker as published on Elle.com on Apr. 11, 2016, "Yoga mats are the worst." Dr. Lahita, a professor of medicine at Rutgers School of Medicine with his M.D. and a PhD in microbiology, observes that yoga mats can harbor bacteria, fungi, viruses, and more. "A yoga mat is a perfect incubator for many of our skin infections," Dr. Lahita noted. "The yoga mat is a very fertile source for infection, mainly because people sweat on them and they rarely are cleaned." Indeed, even where the surfaces of a yoga mat are sought to be cleaned, the core of the mat may remain saturated with viral, fungal, and bacterial sources. Attempting to practice yoga while the mat on which one rests emits a pungent odor is far from desirable.

Moreover, the very act of attempting to sanitize the surfaces of a yoga mat may actually facilitate the breeding of antibiotic-resistant microbes. (see, e.g., "Your gym mats may be breeding antibiotic-resistant germs" by Nsikan Akpan as published on pbs.org on Dec. 11, 2018.) Disadvantageously, deep cleaning a rubber yoga mat by placing the same in a clothes washer and then a dryer is impractical and can damage the mat and the machine. A washing machine can tear a rubber mat apart, and a dryer's high heat can permanently distort and damage the mat rendering it unusable.

Some yoga practitioners will spread an absorbent towel over the mat during yoga practice seeking to absorb perspiration and to facilitate consistent grip and traction. Indeed, specialized grip towels are marketed for precisely those purposes. However, such loose towels can themselves slip relative to the underlying mat thereby again leading to a dangerous loss in traction. Furthermore, bunching and loss of positioning of such towels can be uncomfortable and distracting during an exercise that has at its very core seeking spiritual and mental tranquility.

It is thus apparent that there is a substantial need in the art of yoga for a mat that provides reliable traction, cushioning, and structural integrity and that can be effectively and deeply cleaned thereby to overcome the unsanitary and at times makeshift yoga mat configurations of the prior art and the potentially unreliable traction provided by the same.

SUMMARY OF THE INVENTION

With a knowledge of the foregoing limitations of yoga mats of the prior art, the present invention is founded on the basic object of providing a yoga mat that can be effectively and deeply cleaned by machine washing and drying.

A related object of the invention is to provide a yoga mat that can be cleansed of unsanitary viral, fungal, and bacterial sources and freed of unpleasant odor, dirt, and contamination.

A further object of embodiments of the invention is to provide a lightweight and portable yoga mat that can be readily rolled, transported, and stored An additional object of manifestations of the invention is to provide a yoga mat that supplies traction during yogic poses even when exposed to perspiration.

Another object of the invention is to provide a yoga mat that provides cushioning and comfort.

A further object of practices of the invention is to provide a yoga mat wherein plural layers cooperate synergistically to provide stability, traction, and durability.

Still another object of embodiments of the invention is to provide a yoga mat that provides grip and comfort even when exposed to perspiration without risk of inadvertent bunching or displacement.

These and further objects, advantages, and details of manifestations of the present invention will become obvious not only to one who reviews the present specification and drawings but also to those who have an opportunity to make use of an embodiment of the yoga mat disclosed herein. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth the foregoing objects, one embodiment of the present invention for a machine washable and dryable yoga mat has an upper layer, at least one central layer, and a lower layer. The upper layer is formed from a towel material. The upper layer, the central layer, and the lower layer are fastened together to form a yoga mat body with the central layer or layers disposed between the upper and lower layers. In preferred practices of the invention, the upper layer comprises a cotton towel material, even more preferably a Turkish cotton towel material.

Also according to the invention, the central layer can comprise a layer of foam material. By way of non-limiting example, the central layer can take the form of a layer of fusible foam material, and the central layer can be fused to the upper layer. Still more particularly, as disclosed herein, the central layer can comprise a layer of one-sided fusible interface with the central layer fused to the upper layer but not to the lower layer. The fusible foam material can, for instance, be fusible by the application of heat. Also as taught herein, the upper layer, the central layer, and the lower layer can be joined by stitching.

In certain embodiments, the yoga mat body and the upper, central, and lower layers are rectangular. The central layer then has lateral edges and a width, and the lower layer has lateral edges and a width. The upper layer has a width greater than the widths of each of the central layer and the lower layer, and the upper layer has border strips that communicate longitudinally along lateral edges thereof. The border strips are fastened to wrap around the lateral edges of the central and lower layers and are secured in place, such as by stitching or any other fastening method or combination thereof. In such embodiments, the border strips and a mid-portion of the upper layer can have different thread densities and different resistances to stretch, such as by having greater thread densities and resistances to stretch in the border strips as compared to the mid-portion of the upper layer.

It is further disclosed herein that the lower layer can comprise a polymeric material. By way of example and not limitation, the lower layer can comprise a polymer-coated fabric, such as a polyester woven fabric coated with a continuous layer of plasticized polyvinyl chloride resin, which can render the lower layer water impermeable. Added grip and stability can be provided by an array of protuberances that project from the layer of polyvinyl chloride resin. The lower layer is fastened to the upper and central layers with the array of protuberances facing outwardly.

Where the upper layer, the central layer, and the lower layer are joined by stitching and the yoga mat body is rectangular with lateral edges and first and second ends, side stitching can traverse longitudinally adjacent to the lateral edges of the yoga mat body, end stitching can traverse laterally across the yoga mat body adjacent to the first and second ends thereof, and a plurality of spaced lines of lateral stitching can traverse laterally across the yoga mat body.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

In the accompanying drawing figures:

FIG. 12 is a cross-sectional view of the machine washable and dryable yoga mat taken along the line 12-12 in FIG. 1.

DETAILED DESCRIPTION OF PREFERRED EMBODIMENTS

The machine washable and dryable yoga mat disclosed herein is subject to a variety of embodiments, each within the scope of the invention. However, to ensure that one skilled in the art will be able to understand and, in appropriate cases, practice the present invention, certain preferred embodiments of the broader invention revealed herein are described below and shown in the accompanying drawing figures.

Figure 1:
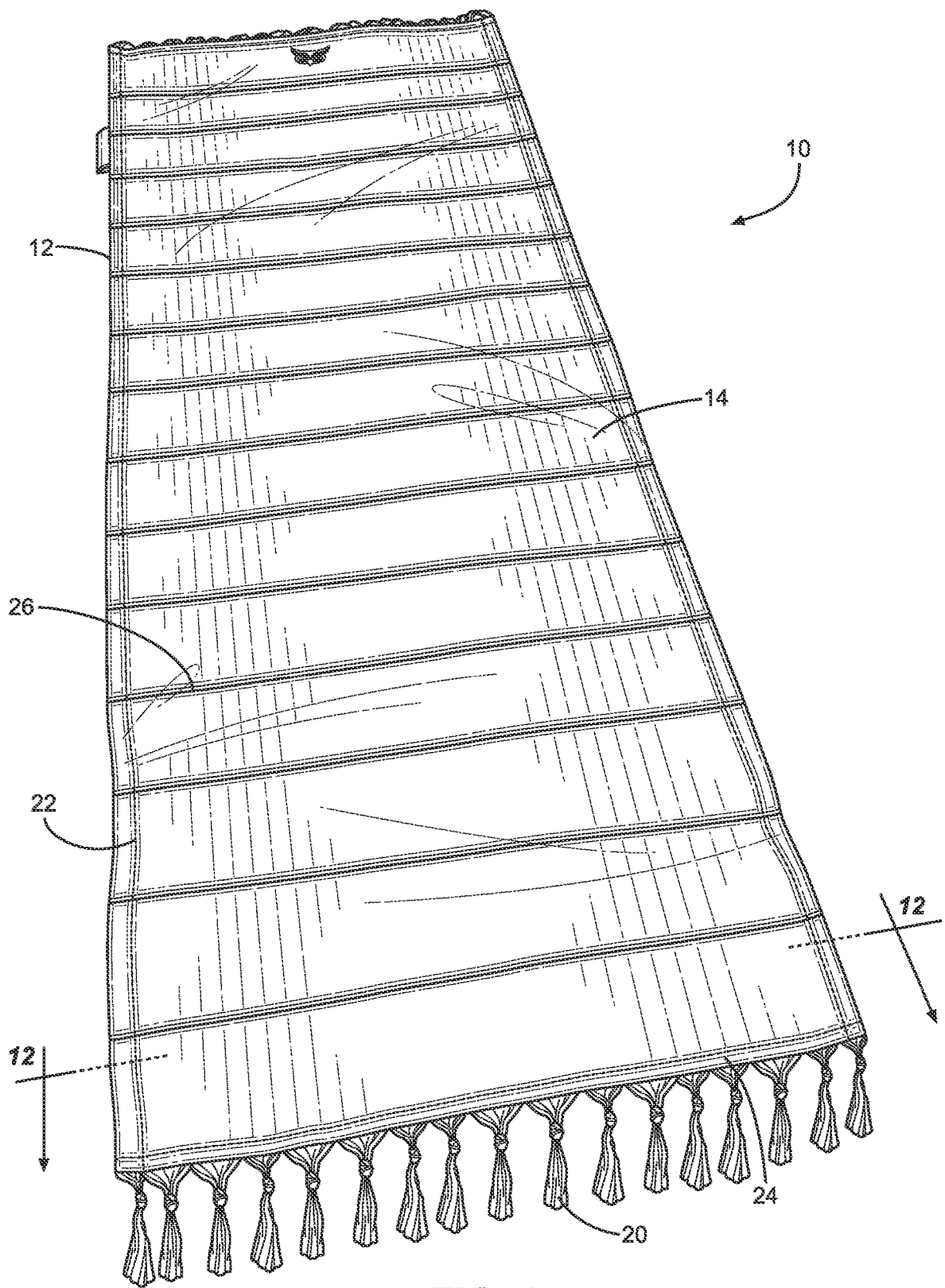
FIG. 1 is an upper perspective view of a machine washable and dryable yoga mat according to the present invention.
Figure 2:
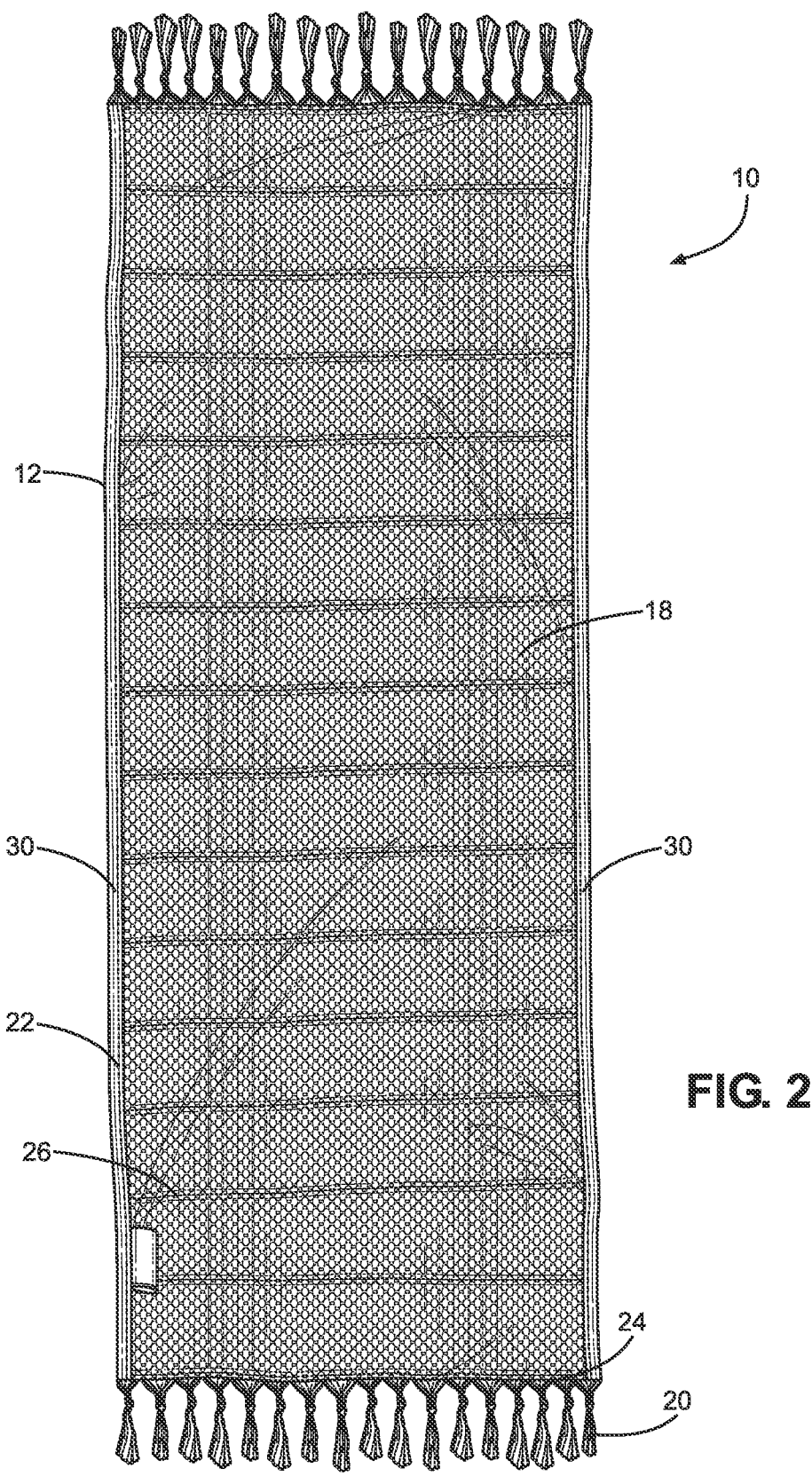
FIG. 2 is a bottom plan view of the machine washable and dryable yoga mat of FIG. 1.

Turning more particularly to the drawings, a machine washable and dryable yoga mat according to the present invention is indicated generally at 10 in FIGS. 1 and 2, and a cross-sectional view of an embodiment of the yoga mat 10 is depicted in FIG. 12. There, the machine washable and dryable yoga mat 10 can be seen to be founded on a yoga mat body 12. The yoga mat body 12 has an upper layer 14 forming an upper surface of the yoga mat 10 and a lower layer 18 forming a lower surface of the yoga mat 10. One or more central layers 16 are disposed between the upper and lower layers 14 and 18. In the depicted embodiment, the yoga mat body 12 is rectangular, but other shapes are possible and within the scope of the invention except as it may be expressly limited by the claims. Where the yoga mat body 12 is rectangular, it may be considered to have left and right lateral edges and first and second end edges. While the mat 10 is often referenced herein as a yoga mat 10, it will be understood that the mat 10 could be used for other disciplines, including Pilates and other exercises, where traction and cushioning are required and where a need for thorough cleaning is presented.

The upper layer 14 comprises a textile layer. In preferred embodiments, the upper layer 14 comprises a rectangular panel of towel material with a finished surface and a non-finished surface. More particularly, according to embodiments of the invention, the upper layer 14 is formed of Turkish towel material. The towel material is preferably formed of premium Turkish cotton with extra-long fibers spun into yarns or threads and joined, such as by weaving, knitting, crocheting, knotting, tatting, felting, bonding, or braiding, into an interlocking network. The towel material of the upper layer 14 is disposed with the finished surface facing outwardly. Turkish towel material has been found to provide a desirable combination of traction, absorbency, and softness such that the upper layer 14 absorbs sweat effectively and provides good grip to the practitioner, even when wet. Indeed, it has been found that the towel upper layer 14 exhibits better traction and grip when saturated with sweat. In that respect, persons who sweat little and persons at the beginning of a yoga session might choose to dampen the upper layer 14, such as with a light spray of water or otherwise, to trigger the unique traction characteristics of the present yoga mat 10.

As is illustrated, for example, in FIGS. 5 through 12, the upper layer 14 has an elongate, longitudinally-communicating mid-portion 32 that is laterally bordered by left and right border strips 30 that form the longitudinally communicating lateral edges of the upper layer 14. In the depicted embodiment, the mid-portion 32 of the upper layer 14 and the border strips 30 have different thread densities and different resistances to stretch. More particularly, the border strips 30 are of a tighter thread density than the mid-portion 32 of the upper layer 14, and the border strips 30 demonstrate greater resistance to longitudinal and lateral stretch than the mid-portion 32.

Figure 10:
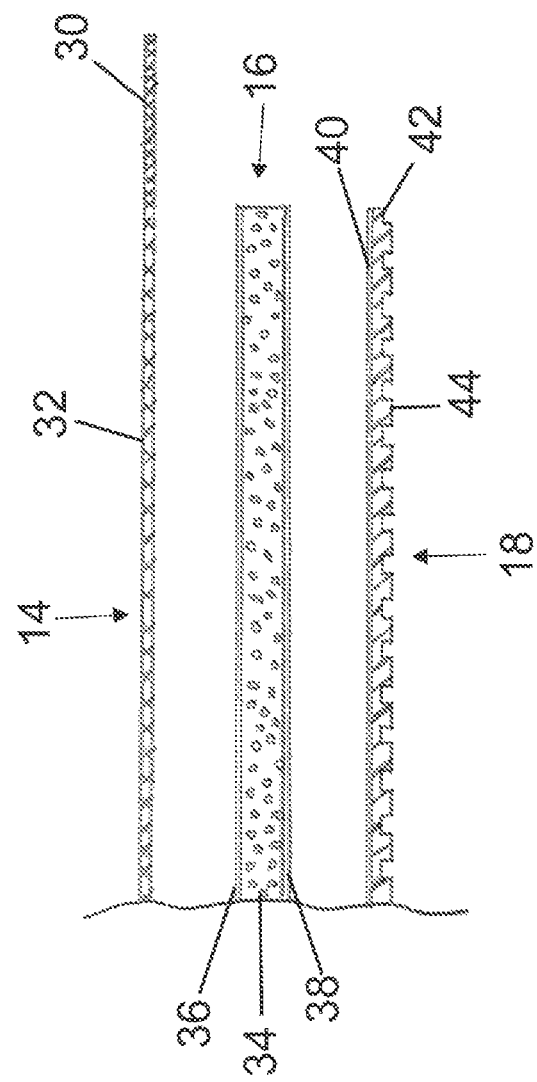
FIG. 10 is a cross-sectional view of layers of the machine washable and dryable yoga mat prior to assembly.

As is illustrated in FIG. 10, the yoga mat 10 can have a single central layer 16. In the example of FIG. 10, there is a single central layer 16 comprising a lightweight layer of foam 34 sandwiched between two layers of soft fabric 36 and 38. The layer of foam 34 can, for example, be 100% polyurethane foam, and the outer layers 36 and 38 can, for instance, be a fabric of 100% polyester. The top layer of soft fabric 36 comprises a fusible interface such that the central layer 16 can be referred to as a one-sided fusible interface, meaning that it can be fused to an adjacent layer, in this case the upper layer 14, such as through the application of heat. One such one-sided fusible interface is manufactured and sold by the Bosal Foam Products Company of Limerick, Maine as the "IN-R-FORM Unique Sew in Foam Stabilizer." Another one-sided fusible interface with a layer of foam 34 sandwiched between two layers 36 and 38 of soft fabric is sold under the trademark FLEX-FOAM 1-sided fusible (FF78F1) by the PCP Group, LLC of Clearwater, Florida operating under the name Pellon Consumer Products. PELLON is a registered trademark. The central layer 16 in the depicted embodiment is marginally shorter than the upper layer 14, and the central layer 16 is narrower than the upper layer 14, such as by being approximately as wide as the mid-portion 32 of the upper layer 14 so that the border strips 30 project beyond the lateral edges of the central layer 16 when the central layer 16 is aligned and centered relative to the upper layer 14.

Figure 11:
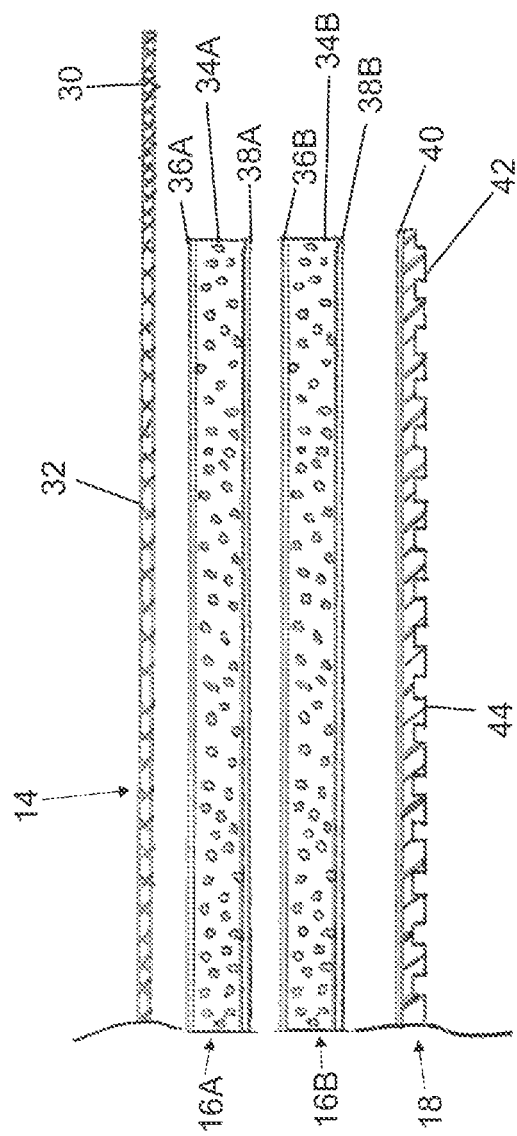
FIG. 11 is a cross-sectional view of layers of an alternative embodiment of the machine washable and dryable yoga mat prior to assembly.

In other embodiments, as is illustrated in FIG. 11 where first and second central layers 16A and 16B are incorporated, the yoga mat 10 can have multiple central layers 16A, 16B, 16n. The central layers 16A, 16B, 16n can be identical to one another, or they can be of different materials or material properties. The central layers 16A, 16B, 16n can each, for example, comprise a one-sided fusible interface so that each can be fused to an adjacent layer, such as with the uppermost central layer 16A fused to the upper layer 14 and each lower central layer 16B, 16n fused to the adjacent central layer 16A and so on. Additional central layers 16B, 16n may be desirable, for example, to provide further cushioning to the yoga mat 10. In other instances, a thicker layer of foam 34 may be employed.

The lower layer 18 comprises a high-friction material providing grip and skid resistance to the yoga mat 10 relative to a floor or other support surface. In preferred embodiments, the lower layer 18 comprises a polymer-coated fabric. As shown in FIGS. 10 and 11, the lower layer 18 can be formed with a layer of fabric 40, such as a polyester woven fabric, coated with a layer of polymeric material 42, such as a polyvinyl chloride (PVC) resin. The layer of polymeric material 42 has an array of protuberances 44 spaced over the surface thereof for further enhancing the grip and skid resistance of the lower layer 18 and the yoga mat 10 in general. For instance, in the depicted embodiment, the array of protuberances 44 comprises an array of evenly spaced round protuberances. Similar to the central layer 16, the lower layer 18 is marginally shorter than the upper layer 14, and the lower layer 18 in the depicted embodiment is narrower than the upper layer 14, such as by being approximately as wide as the mid-portion 32 of the upper layer 14 so that the border strips 30 project beyond the lateral edges of the lower layer 18 when the lower layer 18 is aligned and centered relative to the upper layer 14.

The polymer-coated fabric of the lower layer 18 can, for example, be produced by coating woven fabric with plasticized PVC resin. The woven fabric can be made from high-tenacity, low-shrinkage polyester yarn. Coating can be achieved, by way of example and not limitation, by laminating technology, hot-melt coating technology, or some other effective technology or combination thereof. The high-tenacity and low-shrinkage polyester yarn provides desirable tensile properties and dimensional stability, and the plasticized PVC resin renders the lower layer 18 waterproof while providing durability, resistance to fungal and bacterial attack, and grip and non-skid characteristics in both wet and dry conditions.

One such polymer-coated fabric is sold under the trademark SLIP-NOT DOTS by Eastex Products, Inc. of Plymouth, Massachusetts with 100% polyester woven fabric coated with plasticized PVC Resin. It is available in a weight of 33 ounces per yard. That material is characterized by the manufacturer as waterproof, fire retardant, washable, cold-crack tested to −40° C., and capable of withstanding 12,000 revolutions on the Taber Abrasion Test.

Figure 6:
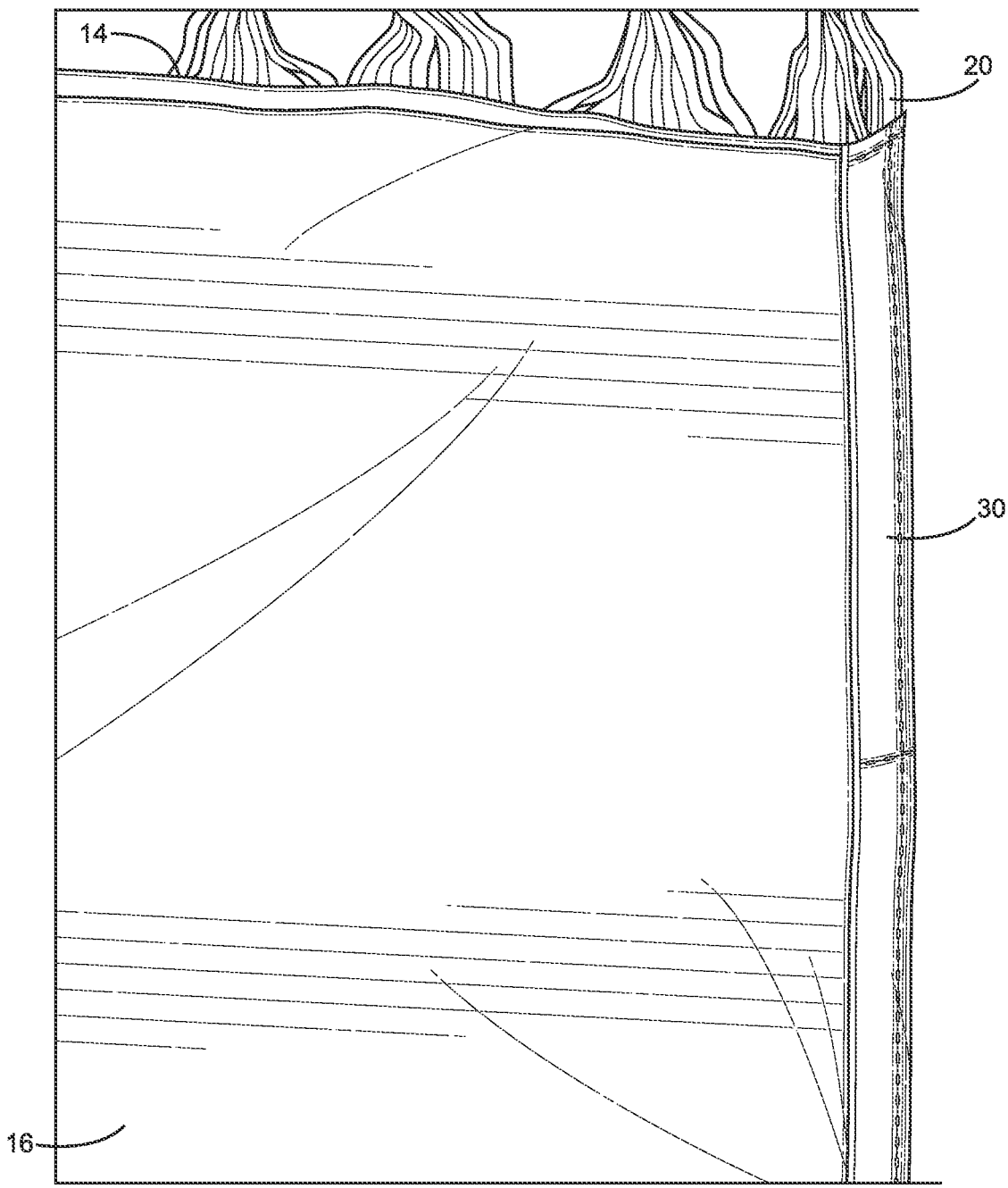
FIG. 6 is a top plan view of a portion of the machine washable and dryable yoga mat during a stage of assembly.

The machine washable and dryable yoga mat 10 can be assembled to create the structure of FIGS. 1 and 2 by first centering the central layer 16 relative to the upper layer 14 as suggested in FIG. 6 with the central layer 16 aligned with the mid-portion 32 of the upper layer 14 and with the border strips 30 of the upper layer 14 projecting beyond the lateral edges of the central layer 16. Then, the central layer 16 can be fixed to the upper layer 14. Where the central layer 16 comprises a fusible interface as disclosed herein, the central layer 16 can be fused to the upper layer 14 by the application of heat. According to the present invention, for example, heat can be applied through a heat ironing process. In certain practices, the ironing could be carried out with a handheld iron or, more preferably, with a heated mangle rotary iron. Where multiple central layers 16A, 16B, 16n are incorporated, the layers 16A, 16B, 16n can be simultaneously, sequentially, or otherwise fused together in alignment.

Figure 7:
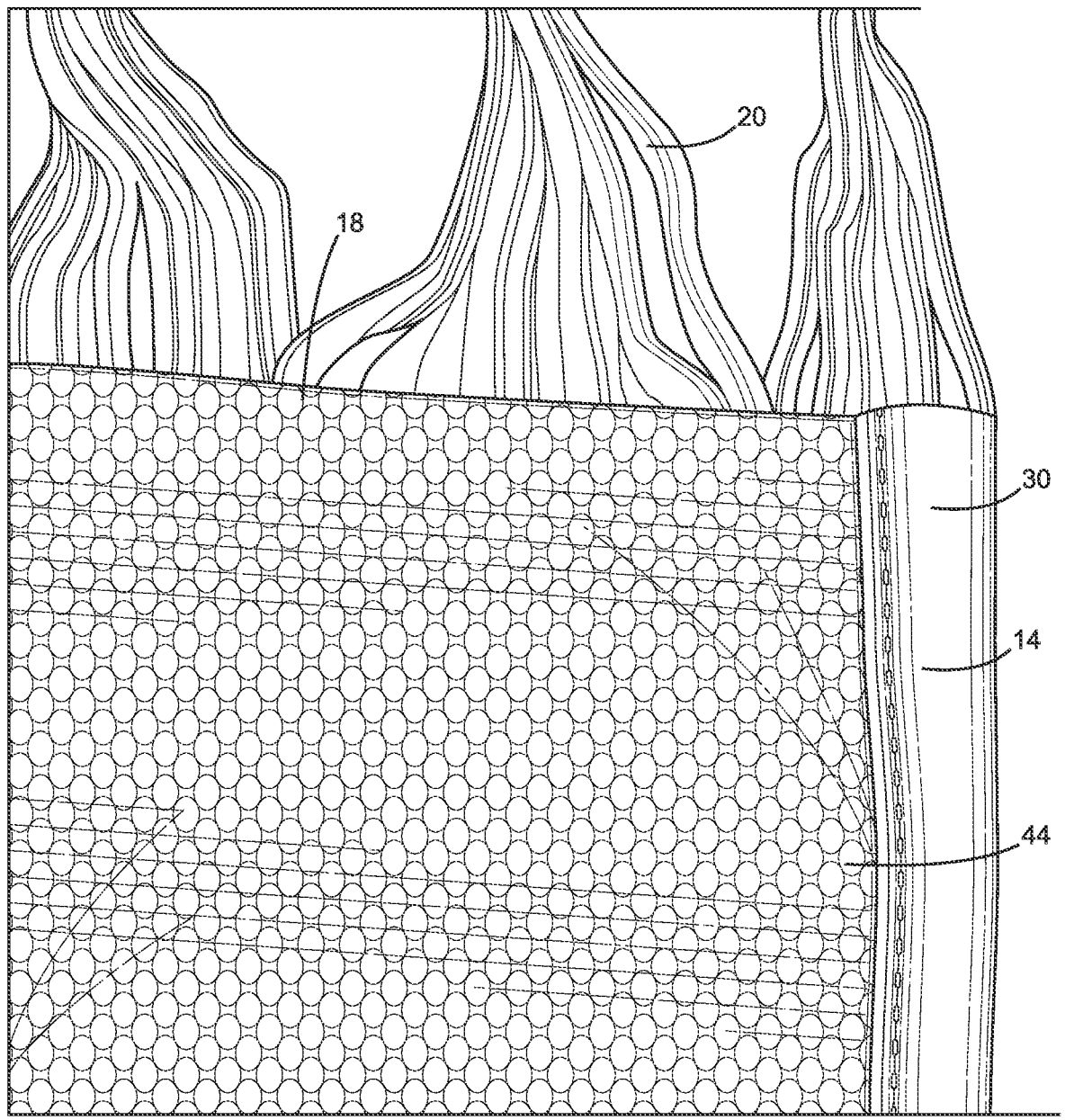
FIG. 7 is a top plan view of a portion of the machine washable and dryable yoga mat during a further stage of assembly.
Figure 8:
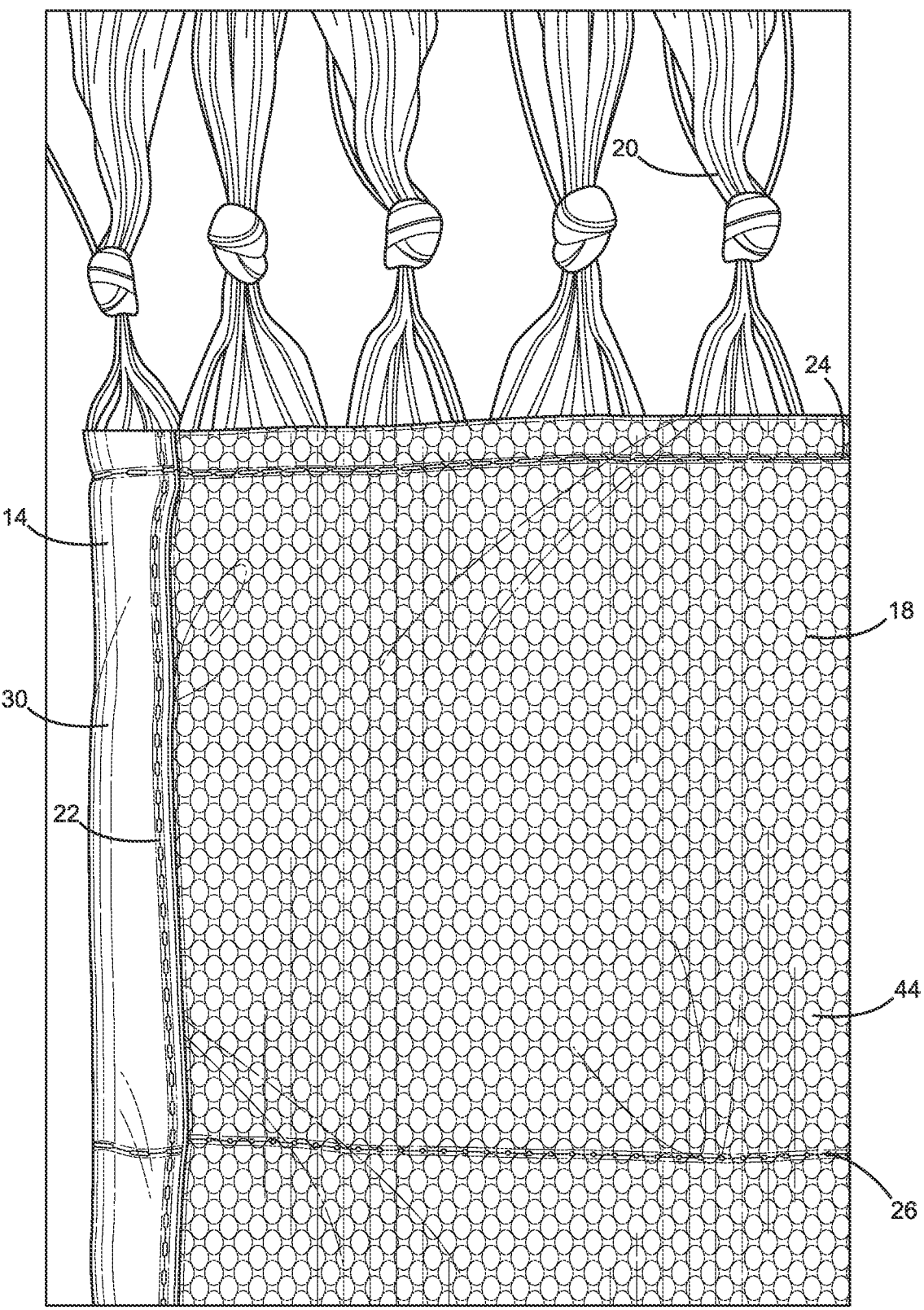
FIG. 8 is a top plan view of a portion of the machine washable and dryable yoga mat during a later stage of assembly.
Figure 9:
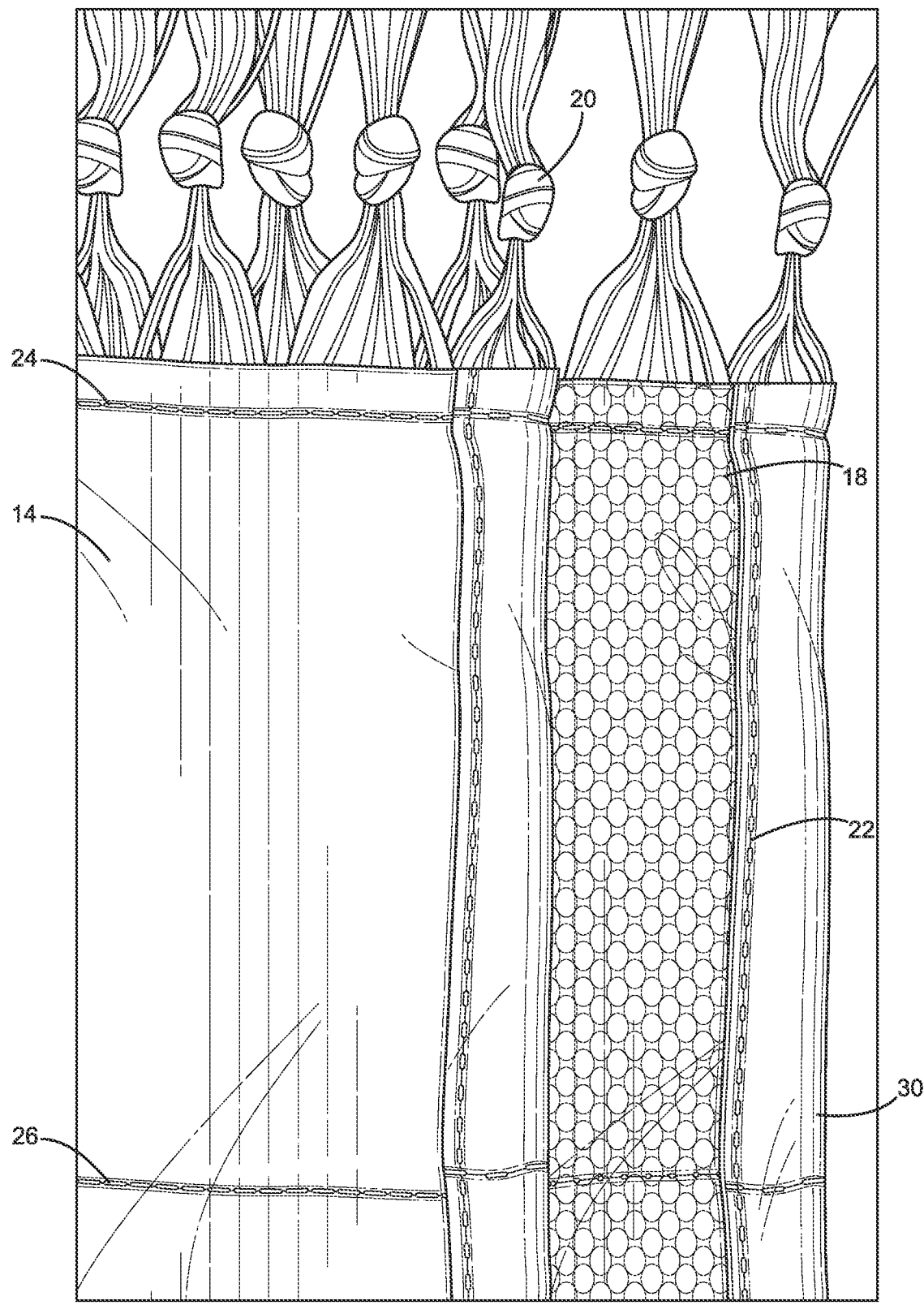
FIG. 9 is a top plan view of portions of the machine washable and dryable yoga mat in a fully-assembled configuration.

With the central layer 16 thus fused to the upper layer 14, the lower layer 18 can then be aligned with the central layer 16 and centered relative to the upper layer 14 with the border strips 30 of the upper layer 14 projecting beyond the lateral edges of the lower layer 18 and with the array of protuberances 44 facing outwardly as is illustrated, for example, in FIG. 7. Then, as FIG. 7 also shows, the border strips 30 of the upper layer 14 can be folded over the lateral edges of the lower layer 18 and the central layer 16 now disposed between the upper layer 14 and the lower layer 18.

With the lower layer 18, the central layer 16, and the upper layer 14 so aligned, the layers 14, 16, and 18 can be mutually fixed together with the border strips 30 of the upper layer 14 folded over the lateral edges of the lower and central layers 18 and 16. While one skilled in the art would fathom numerous ways to fix the layers 14, 16, and 18 together, including adhesive, fasteners, sewing, or another method or combination thereof, the layers 14, 16, and 18 in this embodiment are joined by sewn stitching that mutually binds the layers 14, 16, and 18. More particularly, side stitching 22 traverses longitudinally adjacent to the lateral edges of the yoga mat 10 to pass entirely through the folded border strips 30 of the upper layer 14, through the lower and central layers 18 and 16, and through the overlying upper layer 14 as is illustrated, for example, in FIGS. 1, 2, 8, and 9. With this, a finished edge structure is presented. Furthermore, end stitching 24 traverses laterally across the yoga mat 10 adjacent to the first and second ends thereof passing through all layers 14, 16, and 18 thereby closing the first and second ends. Still further, a plurality of lines of lateral stitching 26 traverse laterally across the body portion 12 of the yoga mat 10 spaced therealong as is again illustrated in a plurality of drawings, including FIGS. 1-4, 8, and 9. Further or different stitching or other fastening would be possible and within the scope of the invention except as the claims might be expressly limited. Advantageously, in addition to the other benefits referenced herein and that are inherent in the structure, the fusing of the central layer 16 to the upper layer 14 renders the sewing stage of the assembly process more efficient and effective as the towel upper layer 14 is already fixed against inadvertent movement.

Figure 3:
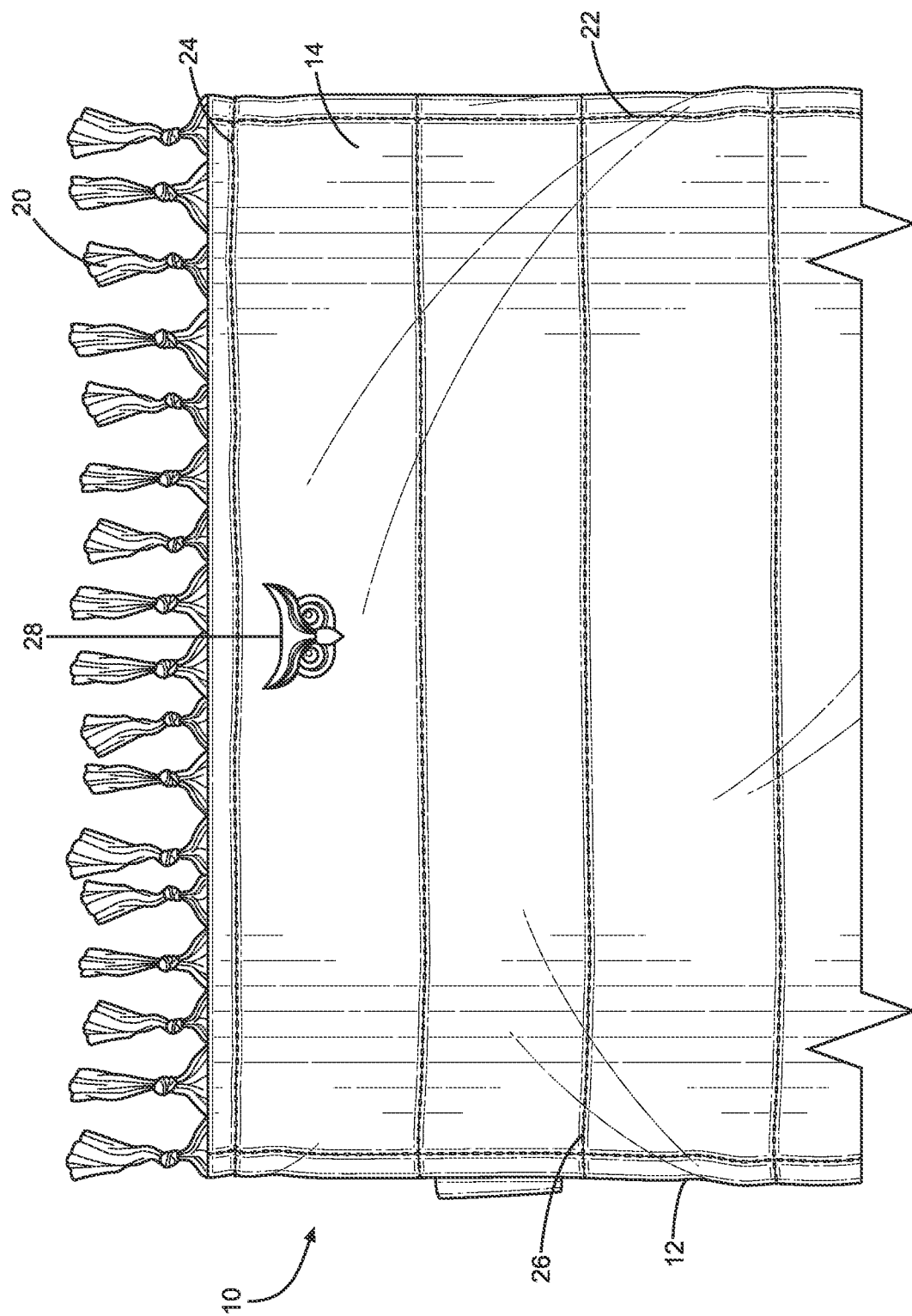
FIG. 3 is a top plan view of an end portion of the machine washable and dryable yoga mat of FIG. 1.
Figure 4:
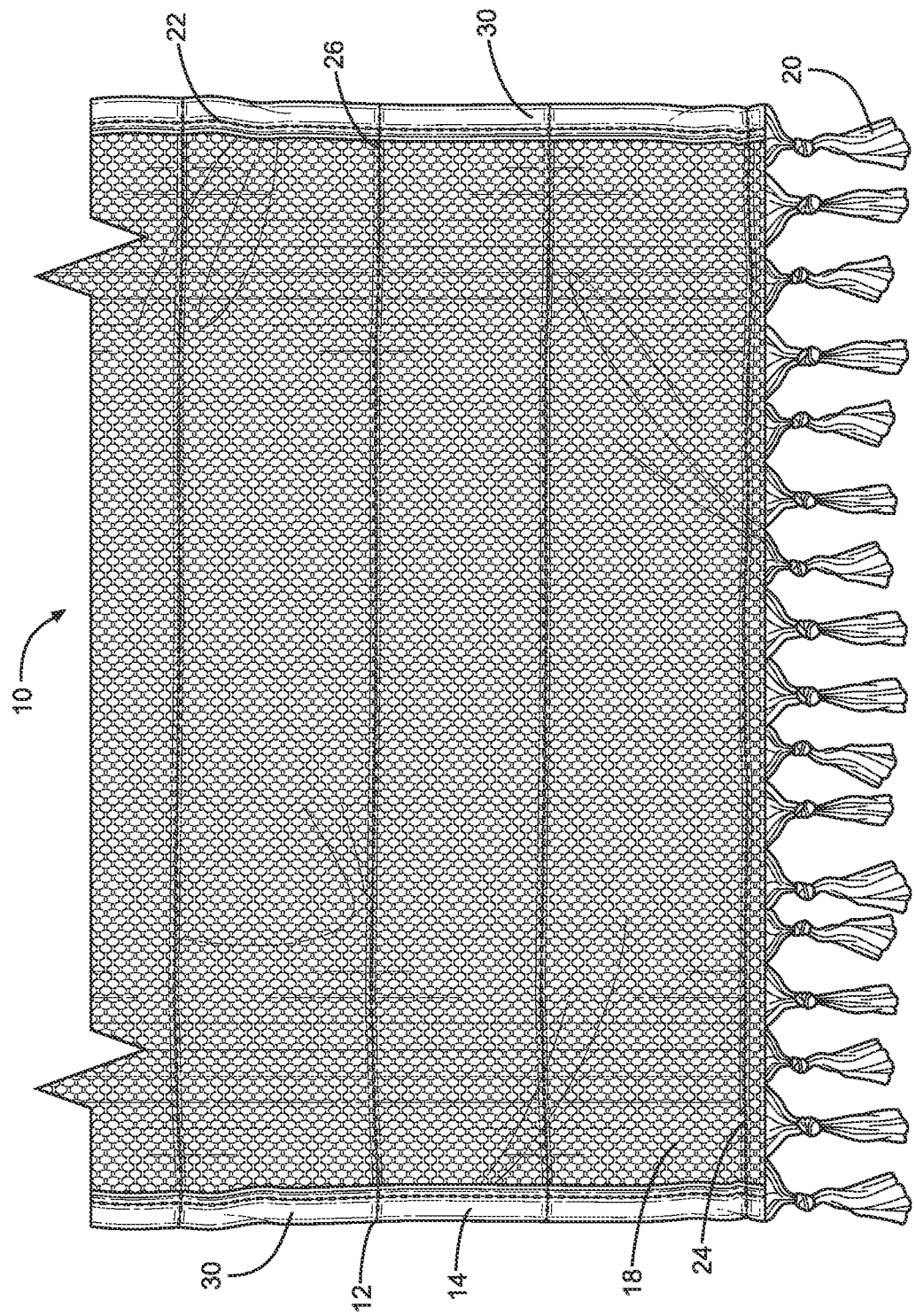
FIG. 4 is a bottom plan view of the end portion of the machine washable and dryable yoga mat of FIG. 1.
Figure 5:
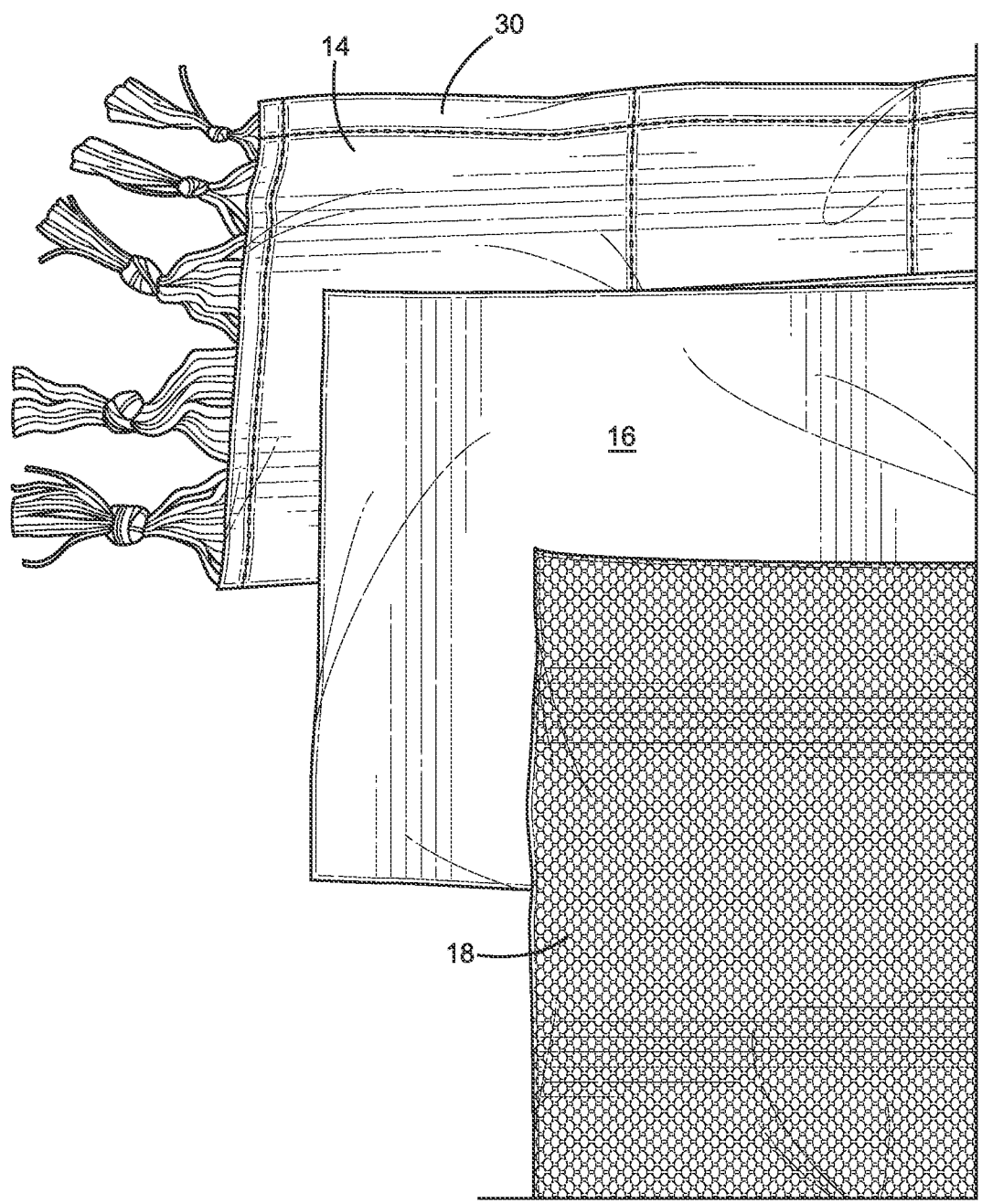
FIG. 5 is a top plan view of the layers of the machine washable and dryable yoga mat of FIG. 1 in a disassembled format.

As can be perceived perhaps most clearly in FIG. 3, the yoga mat 10 has a focal point 28 centrally disposed adjacent to an end thereof with it being noted that an end of a yoga mat is often referred to as the top end. Here, the focal point 28 comprises the head of an owl. It has been found that incorporating such a focal point 28 can provide an enhanced focus to a person practicing yoga, such as by providing a location to maintain one's gaze.

The yoga mat 10 is sized to be portable, such as by being rolled or folded. In certain embodiments, the yoga mat 10 is sized to accommodate a single person. For instance, embodiments are contemplated with a finished width of approximately 27 inches and a finished length, exclusive of tassels 20, of approximately 70 inches. The border strips 30 can be approximately ½ inch each, and the lateral stitching 26 can be spaced at approximately 4 and ¾ inches over the length of the yoga mat 10. For convenience, the yoga mat 10 can have a carrying bag, or a carrying strap (not shown) can be fixed to the yoga mat 10, such as by being fastened to the outer surface of the lower layer 18.

So joined, the properties of the upper, central, and lower layers 14, 16, and 18 cooperate synergistically to yield a yoga mat 10 that provides excellent grip and traction, comfort, shape retention and recovery, durability, and absorbency, all in a mat 10 that is light in weight, sustainable and environmentally sound, and that can be washed and dried to combat viral, fungal, and bacterial sources, odor, dirt, and contamination. Due to its machine washable nature, the yoga mat 10 can be cleaned of sources of contamination, including viral, fungal, and bacterial sources, in a manner that is not possible with prior art mats that are not machine washable, and the need for harsh cleaning and sanitizing chemicals can be eliminated.

The yoga mat 10 provides the desirable absorbency and comfort of a towel without a risk of bunching or misalignment with the cushioning of resiliently compressible foam and the stability and durability of low-stretch polymer-coated fabric. Through the fusing of the towel upper layer 14 to the fusible foam central layer 16 but not to the low-stretch polymer coated fabric of the lower layer 18, the towel upper layer 14 can give and deflect to accommodate strenuous poses while readily returning to shape due to the resiliency of the central layer 16. Should there be any stretching, the upper layer 14 tends to return to its original shape when the yoga mat 10 is washed due to the natural shape recovery of the towel fibers. Indeed, with the progressive softening exhibited by Turkish towel material, the yoga mat 10 can become more comfortable and can provide greater traction with successive washes. The yoga mat 10 is comfortably thick and cushioned while remaining light in weight for ready storage and transport. Moreover, the upper layer 14 of Turkish cotton represents a great benefit to those who are irritated by or allergic to the rubber of prior art mats. Still further, with the upper and central layers 14 and 16 fastened to the low-stretch polymer coated fabric of the lower layer 18 in the spaced locations of the side stitching 22, the end stitching 24, and the lateral stitching 26, varied performance characteristics can be achieved, such as with locations proximate to stitching 22, 24, or 26 demonstrating little or no deflection in the plane of the yoga mat 10 but with the locations spaced from stitching 22, 24, and 26 capable of exhibiting a degree of deflection in the plane of the yoga mat 10 without the immediate restriction of the low-stretch lower layer 18.

It will be understood that terms of orientation used herein, including "upper" and "lower," merely provide a complete understanding of the disclosed machine washable and dryable yoga mat 10. They are not limiting of the invention. Other nomenclature and conventions may be used without limitation of the teachings herein. Furthermore, the various components disclosed herein are merely illustrative and are not limiting. For example, except as limited by the claims, each of the components discussed herein may include subcomponents that collectively provide for the structure and function of the disclosed component. Furthermore, one or more components, sometimes referred to as members or otherwise herein, could be combined as a unitary structure while still corresponding to the disclosed invention. Additional components that provide additional functions or enhancements to those introduced herein may be included. For example, additional components or materials, combinations of components or materials, and perhaps the omission of components or materials may be used to create embodiments that are nonetheless within the scope of the invention.

When referencing or introducing elements of the present invention or embodiments thereof, the articles "a," "an," and "the" are intended to mean that there are one or more of the elements. Terms such as "comprising," "including," and "having" are intended to be inclusive such that there may be additional elements other than the listed elements. As used herein, the terms "example" and "exemplary" are not intended to imply a superlative example. Rather, such terms refer to an embodiment that is one of many possible embodiments.

Accordingly, with certain details and embodiments of the present invention for a machine washable and dryable yoga mat 10 disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded to the inventor. Those claims shall be deemed to include equivalent constructions insofar as they do not depart from the spirit and scope of the invention. It must be further noted that a plurality of the following claims may express, or be interpreted to express, certain elements as means for performing a specific function, at times without the recital of structure or material. As the law demands, any such claims shall be construed to cover not only the corresponding structure and material expressly described in this specification but also all legally-cognizable equivalents thereof.

The invention claimed is:

1. A machine washable and dryable yoga mat comprising:
an upper layer comprising a towel material;
a central layer comprising a layer of foam material; and
a lower layer;
wherein the upper layer, the central layer, and the lower layer are fastened together to form a yoga mat body with the central layer disposed between the upper and lower layers wherein the upper layer, the central layer, and the lower layer are joined by stitching and wherein the central layer is fused to the upper layer but not to the lower layer;
wherein the yoga mat body and the upper, central, and lower layers are rectangular, wherein the central layer has lateral edges and a width, wherein the lower layer has lateral edges and a width; and
wherein the upper layer has border strips that communicate longitudinally along lateral edges thereof and a mid-portion spanning between the border strips, wherein the mid-portion has a different thread density and resistance to stretch relative to the border strips, wherein the border strips are of a tighter thread density than the mid-portion, and wherein the border strips demonstrate greater resistance to longitudinal and lateral stretch than the mid-portion.

2. The yoga mat of claim 1, wherein the upper layer comprises a cotton towel material.

3. The yoga mat of claim 2, wherein the upper layer comprises a Turkish cotton towel material.

4. The yoga mat of claim 1, wherein the central layer comprises a layer of fusible foam material.

5. The yoga mat of claim 4, wherein the central layer comprises a layer of one-sided fusible interface.

6. The yoga mat of claim 4, wherein the central layer comprises a layer of fusible foam material fusible by application of heat.

7. The yoga mat of claim 1, wherein the upper layer has a width greater than the widths of each of the central layer and the lower layer, and wherein the border strips of the upper layer are fastened to wrap around the lateral edges of the central and lower layers.

8. The yoga mat of claim 1, wherein there are plural central layers disposed between the upper and lower layers.

9. The yoga mat of claim 1, wherein the lower layer comprises a polymeric material.

10. The yoga mat of claim 9, wherein the lower layer comprises a polymer-coated fabric.

11. The yoga mat of claim 10, wherein the lower layer comprises a fabric coated with a plasticized resin.

12. The yoga mat of claim 11, wherein the lower layer comprises polyester woven fabric coated with a layer of polyvinyl chloride resin.

13. The yoga mat of claim 12, wherein the layer of polyvinyl chloride resin has an array of evenly spaced round protuberances and wherein the lower layer is fastened to the upper and central layers with the array of protuberances facing outwardly.

14. The yoga mat of claim 1, wherein the stitching that joins the lower layer, the central layer, and the upper layer comprises side stitching that traverses longitudinally adjacent to the lateral edges of the yoga mat body, end stitching that traverses laterally across the yoga mat body adjacent to the first and second ends thereof, and a plurality of spaced lines of lateral stitching that traverse laterally across the yoga mat body.

15. A machine washable and dryable yoga mat comprising:
a rectangular upper layer with lateral edges and a width, the upper layer comprising a towel material;
a rectangular lower layer with lateral edges and a width, the lower layer comprising a polymer-coated fabric;
a rectangular central layer with lateral edges and a width, the central layer comprising a layer of one-sided fusible foam interface material wherein the central layer is fused to the upper layer but not to the lower layer; and
wherein the upper layer, the central layer, and the lower layer are fastened together by stitching to form a yoga mat body with the central layer disposed between the upper and lower layers, wherein the upper layer has a width greater than the widths of each of the central layer and the lower layer, and wherein the upper layer has border strips that communicate longitudinally along lateral edges thereof that are fastened to wrap around the lateral edges of the central and lower layers.

16. The yoga mat of claim 15 wherein the lower layer, the central layer, and the upper layer are joined by side stitching that traverses longitudinally adjacent to the lateral edges of the yoga mat body, by end stitching that traverses laterally across the yoga mat body adjacent to the first and second ends thereof, and by a plurality of spaced lines of lateral stitching that traverse laterally across the yoga mat body.

17. The yoga mat of claim 15 wherein the upper layer has border strips that communicate longitudinally along lateral edges thereof and a mid-portion spanning between the border strips, wherein the mid-portion has a different thread density and resistance to stretch relative to the border strips, wherein the border strips are of a tighter thread density than the mid-portion, and wherein the border strips demonstrate greater resistance to longitudinal and lateral stretch than the mid-portion.

* * * * *